(12) United States Patent
Shah et al.

(10) Patent No.: US 8,370,690 B1
(45) Date of Patent: Feb. 5, 2013

(54) CUSTOM DEFINED CALL QUALITY VERSUS BATTERY LIFE

(75) Inventors: Maulik K Shah, Overland Park, KS (US); Jason Peter Sigg, Olathe, KS (US); Jasinder Pal Singh, Olathe, KS (US); Ashish X Bhan, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 465 days.

(21) Appl. No.: 12/768,865

(22) Filed: Apr. 28, 2010

(51) Int. Cl.
    *G06F 11/00* (2006.01)
(52) U.S. Cl. ........... 714/708; 714/704; 455/68; 455/522
(58) Field of Classification Search .............. 455/68, 455/522
    See application file for complete search history.

(56) References Cited

U.S. PATENT DOCUMENTS

| | | | | |
|---|---|---|---|---|
| 5,467,341 A * | 11/1995 | Matsukane et al. | ........... | 370/253 |
| 5,603,096 A * | 2/1997 | Gilhousen et al. | ............... | 455/69 |
| 5,974,327 A * | 10/1999 | Agrawal et al. | ............ | 455/452.2 |
| 6,802,035 B2 * | 10/2004 | Catreux et al. | ................ | 714/746 |
| 6,810,246 B1 * | 10/2004 | Kalofonos et al. | ........... | 455/423 |
| 6,842,616 B2 * | 1/2005 | Takano et al. | .............. | 455/435.2 |
| 7,159,155 B2 * | 1/2007 | Obuchi et al. | ................. | 714/704 |
| 7,242,920 B2 * | 7/2007 | Morris | .......................... | 455/405 |
| 7,398,106 B2 * | 7/2008 | Conyers et al. | ............... | 455/557 |
| 7,496,374 B2 * | 2/2009 | Malkamaki | .................. | 455/522 |

* cited by examiner

*Primary Examiner* — Steve Nguyen

(57) ABSTRACT

Embodiments of the present invention provide systems, methods, and computer-readable media for modifying frame error rates associated with a mobile device. In embodiments, a mobile device is assigned an initial frame error rate. In response to determining the initial frame error rate does not match a desired frame error rate, a frame error rate modification request is generated. The frame error rate modification request is transmitted to a base station. At the base station, a modified frame error rate that matches the desired frame error rate is associated with the mobile device.

13 Claims, 5 Drawing Sheets

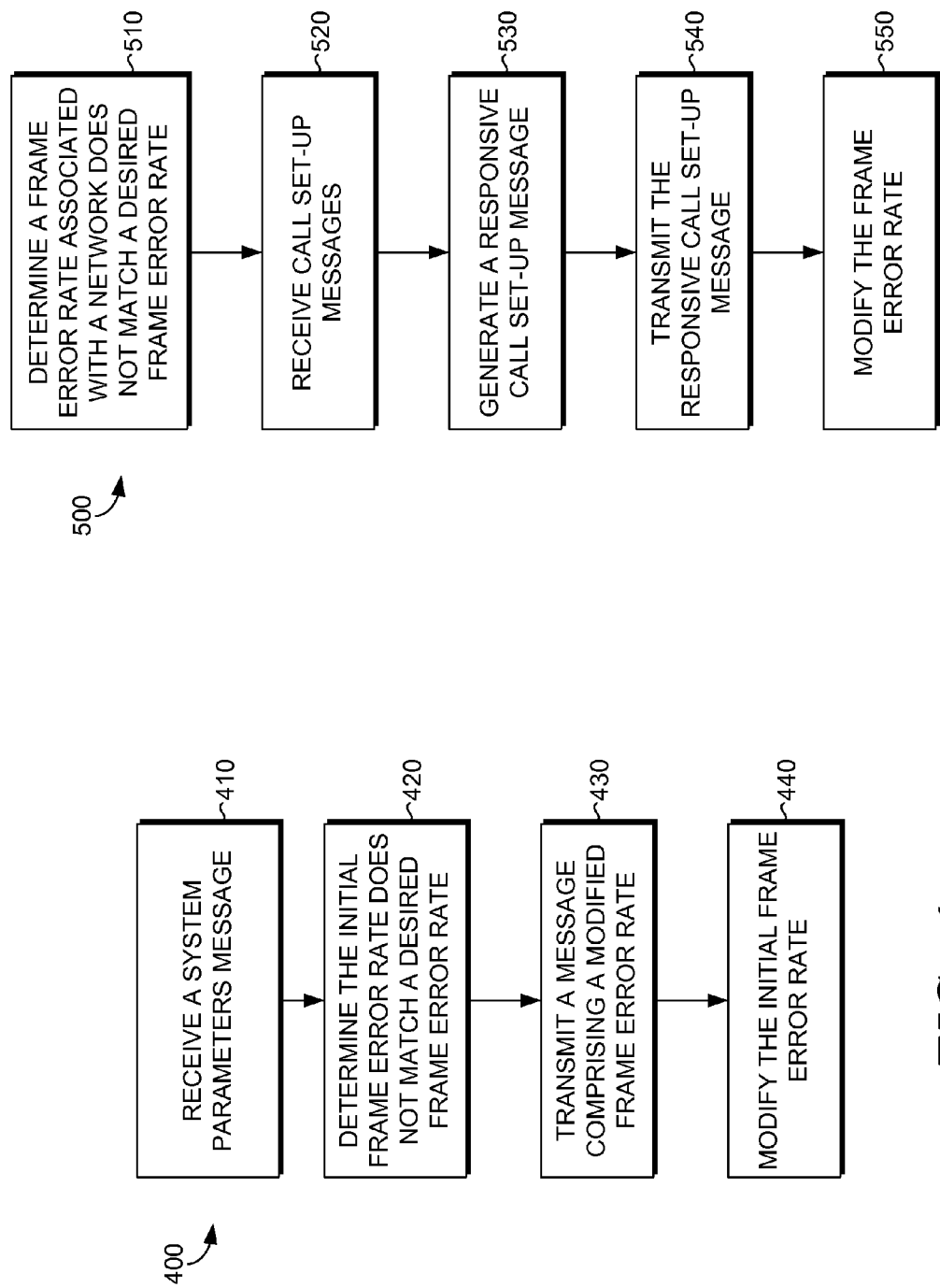

CUSTOM DEFINED CALL QUALITY VERSUS BATTERY LIFE

SUMMARY

Embodiments of the invention are defined by the claims below, not this summary. A high-level overview of various aspects of the invention are provided here for that reason, to provide an overview of the disclosure, and to introduce a selection of concepts that are further described below in the Detailed Description section. This summary is not intended to identify key features of the claimed subject matter, nor is it intended to be used as an aid in isolation to determine the scope of the claimed subject matter.

Mobile phone users are generally concerned with a mobile phone's call quality. They are also generally concerned with a mobile phone's battery life, which may be decreased by efforts to improve call quality. However, mobile phone users are currently unable to exercise control over a preference between call quality and battery life. As such, it would be beneficial for mobile phone users to have options to manage settings of their mobile phones to prioritize between call quality and battery life.

In a first aspect, a set of computer-usable instructions provide a method of modifying frame error rates associated with a mobile device. The method includes receiving, at the mobile device, a system parameters message originating from a base station. The system parameters message includes an initial frame error rate. The method further includes determining that the initial frame error rate does not match a desired frame error rate. Additionally, the method includes transmitting, from the mobile device, a message, such as an extended channel assignment message, that includes a modified frame error rate associated with the mobile device in response to receiving the system parameters message. The modified frame error rate matches the desired frame error rate. The initial frame error rate is then modified at the cell node. A cell node is a point of connection into a cellular network.

In a second aspect, a set of computer instructions provide a method of modifying frame error rates associated with a mobile device. The method includes determining that a frame error rate associated with a network does not match a desired frame error rate. The method further includes receiving, at the mobile device, call set-up messages originating from a cell node. Additionally, the method includes generating, at the mobile device, a responsive call set-up message that includes a modified frame error rate within a reserved field of the message. The responsive message is then transmitted from the mobile device to the cell node. The modified frame error rate is between the frame error rate associated with the network and the desired frame error rate. Further, the frame error rate is modified at the cell node to be the modified frame error rate in response to receiving the responsive call set-up message.

In a third aspect, a set of computer-usable instructions provide a method of modifying frame error rates associated with a mobile device. The method includes associating an unused sector with a command to modify a frame error rate. The method further includes receiving, at the mobile device, a system parameters message originating from a cell node of a network. The system parameters message includes an initial frame error rate. Additionally, a message addressed to the unused sector is generated at the mobile device. Further, the message is transmitted from the mobile device to the cell node. In response to receiving the message addressed to the unused sector, the initial frame error rate is modified at the cell node.

BRIEF DESCRIPTION OF THE SEVERAL VIEWS OF THE DRAWINGS

Illustrative embodiments of the present invention are described in detail below with reference to the attached drawing figures, and wherein:

FIG. 4 is a flow diagram showing an embodiment of a method of modifying frame error rates associated with a mobile device, in accordance with an embodiment of the present invention;

FIG. 5 is a flow diagram showing another embodiment of a method of modifying frame error rates associated with a mobile device, in accordance with an embodiment of the present invention.

DETAILED DESCRIPTION

Figure 1:
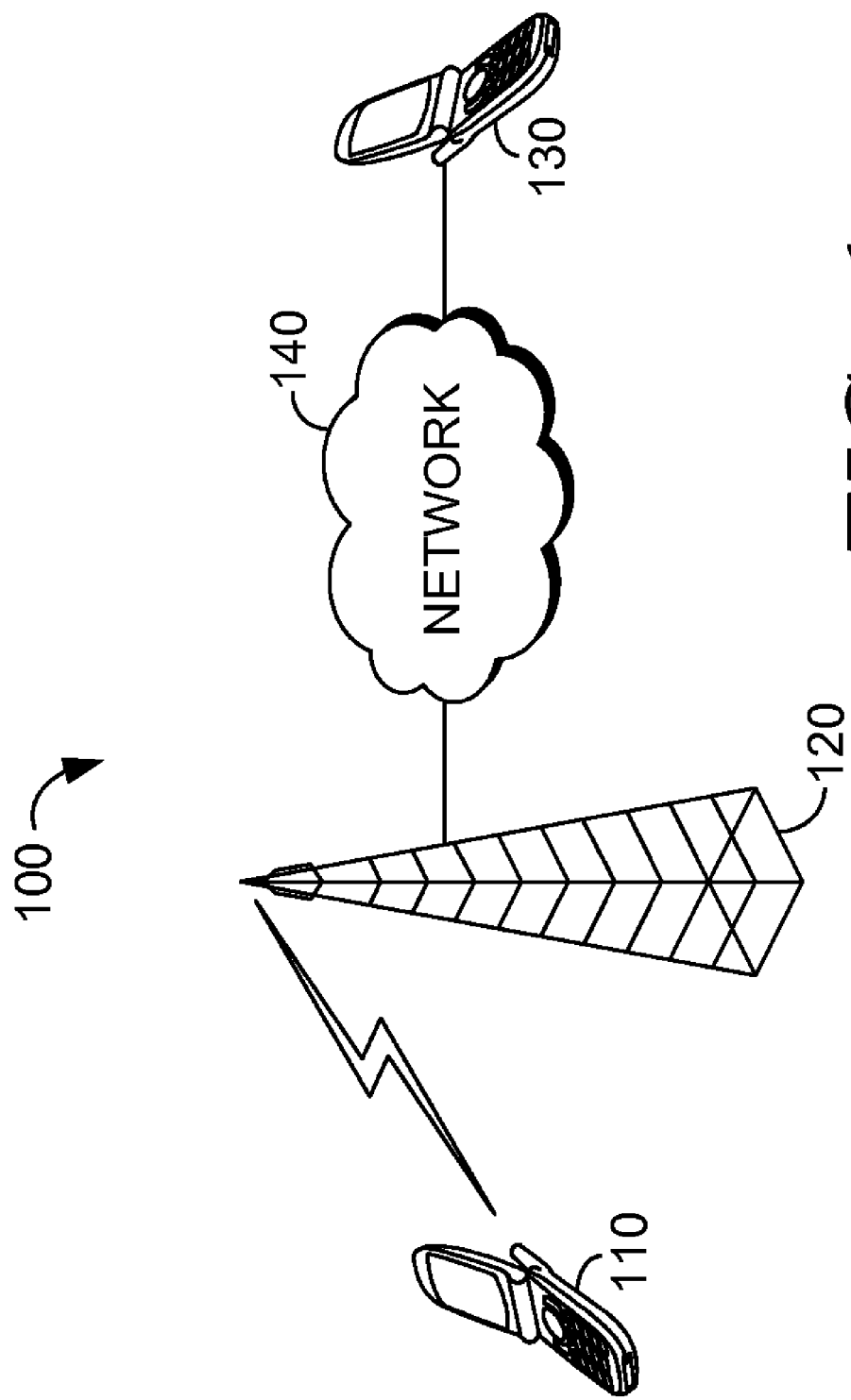
FIG. 1 depicts an illustrative computing system for modifying frame error rates associated with a mobile device, in accordance with an embodiment of the present invention.

The subject matter of embodiments of the present invention is described with specificity herein to meet statutory requirements. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| CD-ROM | Compact Disk Read Only Memory |
| CDMA | Code Division Multiple Access |
| DVD | Digital Versatile Discs |
| EEPROM | Electrically Erasable Programmable Read Only Memory |
| LAN | Local Area Network |
| MP3 | MPEG-1 Audio Layer 3 |
| PC | Personal Computer |
| PDA | Personal Digital Assistant |
| RAM | Random Access Memory |
| ROM | Read Only Memory |
| WAN | Wide Area Network |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media include media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the present invention provide systems, methods, and computer-readable media for modifying frame error rates associated with a mobile device. Mobile devices communicate information across a cellular network, hereinafter referred to as "network." In particular, a mobile device communicates information to a base station of a network. In cellular technology, a base station is a fixed station used for communicating with mobile devices. Each cell in a cellular network requires a base station.

A frame error rate measures the integrity of information sent between mobile devices. In particular, the frame error rate is a measure of the proportion of corrupted frames within an overall transmission of information. For example, a frame error rate may be used to measure the integrity of information communicated between a mobile device and a base station of a network.

For example, in a phone call, information may be transmitted from a first mobile device to a base station of a network in packets, or frames, that are approximately 20 milliseconds in duration. If a portion of the frame sent from a first mobile device to the network base station is corrupted, then the information in that frame is not transmitted to a second mobile device. When multiple frames are corrupted, a user listening to the call on the second mobile device will hear a gap in conversation. Generally speaking, the human ear can hear a break of 60 milliseconds. For a user at the second mobile device, a break of at least 60 milliseconds will likely sound like a gap in the conversation. As such, in order to ensure the auditory perception of a seamless call, mobile communications providers may attempt to assign a low enough frame error rate threshold associated with a mobile device so as to ensure high phone call quality.

When the first mobile device fails to meet a threshold frame error rate associated with a network, the network instructs the first mobile device to increase the power between the first mobile device and a base station. In particular, once a mobile device is assigned a particular frame error rate by a network, it will increase power between the mobile device and a base station, if necessary, to obtain the assigned frame error rate. However, increasing power between the mobile device and the base station generally has the consequence of draining the battery of the mobile device.

As such, users who have a preference of preserving battery life of a mobile device may prefer to block their mobile device from increasing power between the mobile device and the base station, even if that results in having a higher frame error rate. For example, a user who is away from a source of a battery charge may prefer to have a higher frame error rate, including the potential for choppy and/or lost phone calls, in order to maximize the battery life of his mobile device. In fact, if the user was not making calls, but rather was transmitting non-urgent text and/or e-mail messages, the user may prefer to have the battery life of his mobile device maximized, even if that means it might take longer for e-mail messages to be transmitted.

Conversely, users who have a preference of maximizing phone quality may prefer to maximize the power allowable between the mobile device and the base station, even if that resulted in power being quickly drained from the batteries of mobile devices. In particular, a user who keeps his mobile phone plugged into a wall may have little reason to keep from maximizing the phone quality of his phone calls, since the rate of battery drain would arguably be moot. Alternatively, a user who is expecting an important call, such as a job interview, may prefer to drain the battery of his mobile device so long as the integrity of the call is maximized. As such, users may have disparate preferences regarding call quality versus battery life. Accordingly, embodiments of the present invention provide systems, methods, and computer-readable media for modifying frame error rates associated with mobile devices.

Currently, a mobile device utilizing a network for transmitting information is assigned a frame error rate chosen by that network. In particular, during communication between a mobile device and a base station of a network, the base station will assign the mobile device a frame error rate. However, as discussed above, there may be a conflict between the frame error rate assigned to the mobile device and a desired frame error rate of the mobile device user. To resolve this conflict, a mobile device may request for a network to have the frame error rate associated with the network offset by some amount in order to match a desired frame error rate associated with the mobile device. In particular, the mobile device may request for a base station to amend the frame error rate associated with the network to be offset by a certain amount.

A mobile device may utilize reserved fields within communications between the mobile device and an associated base station to request that a frame error rate of a network be offset by a set amount to match a desired frame error rate. For instance, if the frame error rate of a network is set at 2%, and the desired frame error rate of a mobile device is 3%, the mobile device may utilize reserved fields within communications between the mobile device and the base station to request that the base station offset the frame error rate by an increase of 1%. By utilizing reserved fields, embodiments of the present inventions may be implemented without requiring a change to a networking standard.

Alternatively, a mobile device may direct a message to an unused sector to request that a network modify a frame error rate associated with the mobile device. A sector is a portion of cell coverage of a cell node. In particular, sectoring divides the number of channels assigned to a cell node. Commonly, a cell antenna is divided into three sectors, each with a 120-degree coverage pattern. While some sectors are used to provide cell coverage, it is possible to purposefully address a message to an unassigned sector, referred to herein as an "unused sector," in order to convey information to a base station that interprets the message. In particular, a network may associate the receipt of a message directed to an unused sector with a certain command.

For example, if a mobile device addresses a message to a first unused sector, the network may interpret the message as a request to modify a frame error rate associated with that mobile device by increasing the frame error rate by 2%. Alternatively, if a mobile device addresses a message to a second unused sector, the network may interpret the message as a request to modify a frame error rate associated with that mobile device by decreasing the frame error rate by 1%. Further, if a mobile device addresses a message to a third unused sector, the network may interpret the message as a request to reset a frame error rate associated with that mobile device to match the frame error rate associated with the network.

FIG. 1 depicts an illustrative computing system 100 for modifying frame error rates associated with a mobile device, in accordance with an embodiment of the present invention. As shown in FIG. 1, computing system 100 includes a first mobile device 110, a base station 120, and a second mobile device 130. The first mobile device 110, base station 120, and second mobile device 130 can communicate by way of network 140. Network 140 could be wired, wireless, or both. Network 140 can be a single network or can include multiple networks, as well as being a network of networks, but is shown in more simple form so as to not obscure other aspects of the present invention. For example, network 140 may include one or more wide area networks (WANs), one or more local area networks (LANs), one or more public networks, such as the Internet, and/or one or more private networks. Network 140 might include an array of devices, which are not shown so as to not obscure more relevant aspects of the invention. In a wireless telecommunications network, components such as a base station, a communications tower, or even access points (as well as other components) can provide wireless connectivity. Although single components are illustrated for clarity, one skilled in the art will appreciate that network 140 can enable communication between any number of mobile devices.

First mobile device 110 and/or second mobile device 130 can be any mobile device that is capable of communication and/or web accessibility. As such, first mobile device 110 and/or second mobile device 130 might take on a variety of forms, such as a personal computer (PC), a laptop computer, a mobile phone, a personal digital assistance (PDA), a MP3 player, a video player, a handheld communications device, a workstation, any combination of these devices, or any other device that is capable of communication and/or web accessibility. In one embodiment, first mobile device 110 and/or second mobile device 130 is a mobile device that utilizes a wireless telecommunications network to communicate. Makers of illustrative mobile devices include, for example, Research in Motion®, Creative Technologies Corp., Samsung®, Nokia®, LG®, Motorola®, Apple® Computer, and the like. A mobile device can include, for example, a display (s), a processor, a power source(s) (e.g., a battery), a data store(s), a speaker(s), memory, a buffer(s), and the like.

A mobile device, such as first mobile device 110, may request to modify a frame error rate associated with the mobile device. In embodiments, the mobile device receives a system parameters message from a base station of a network. The mobile device may then determine whether a frame error rate associated with the network matches a frame error rate associated with the mobile device. Once it is determined that a frame error rate associated with the network does not match a desired frame error rate associated with the mobile device, the mobile device may request the modification during call set-up or during a call.

Figure 2:
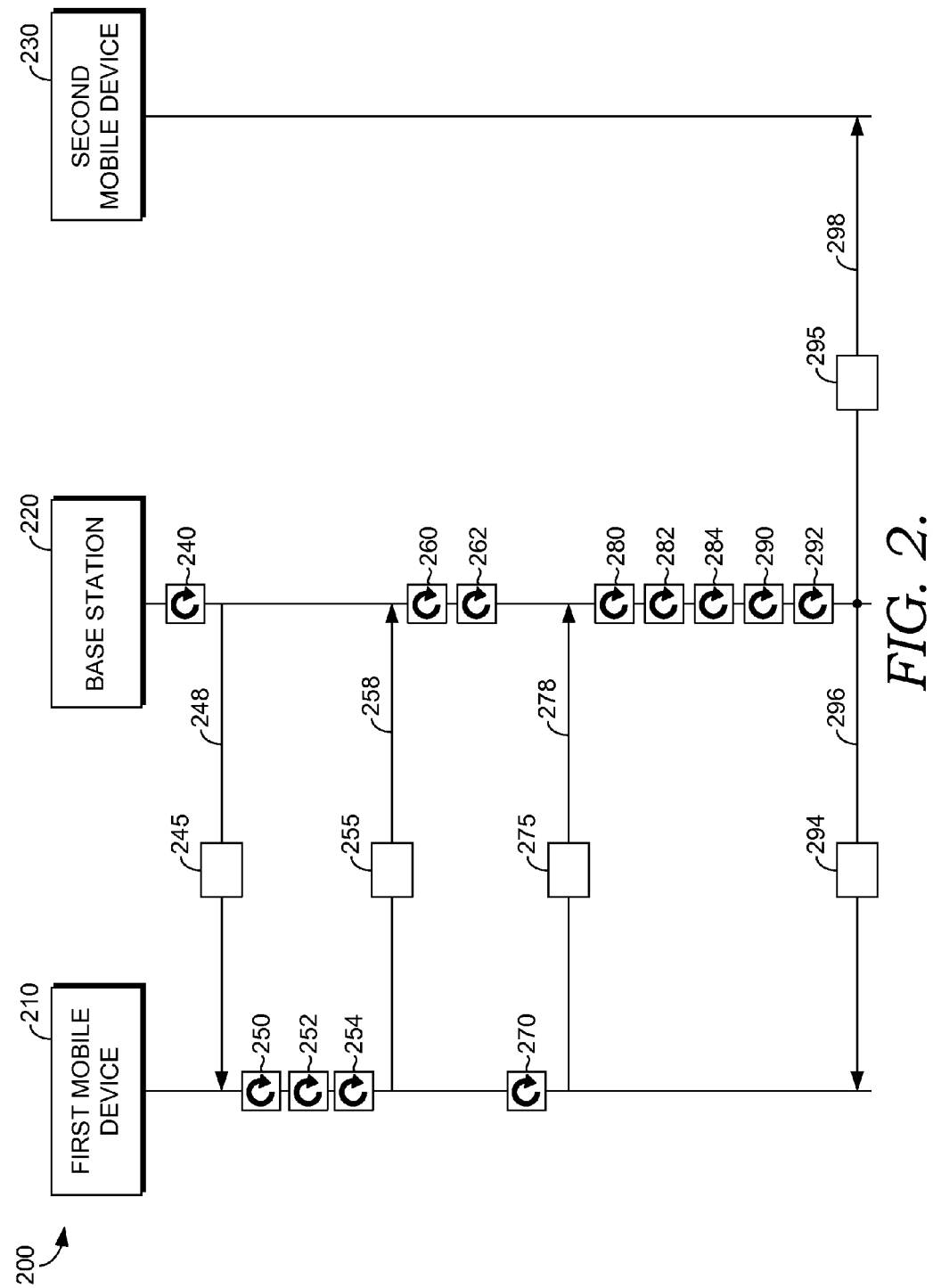
FIG. 2 depicts an illustrative flow diagram of a process for modifying frame error rates associated with a mobile device, in accordance with an embodiment of the present invention.
Figure 3:
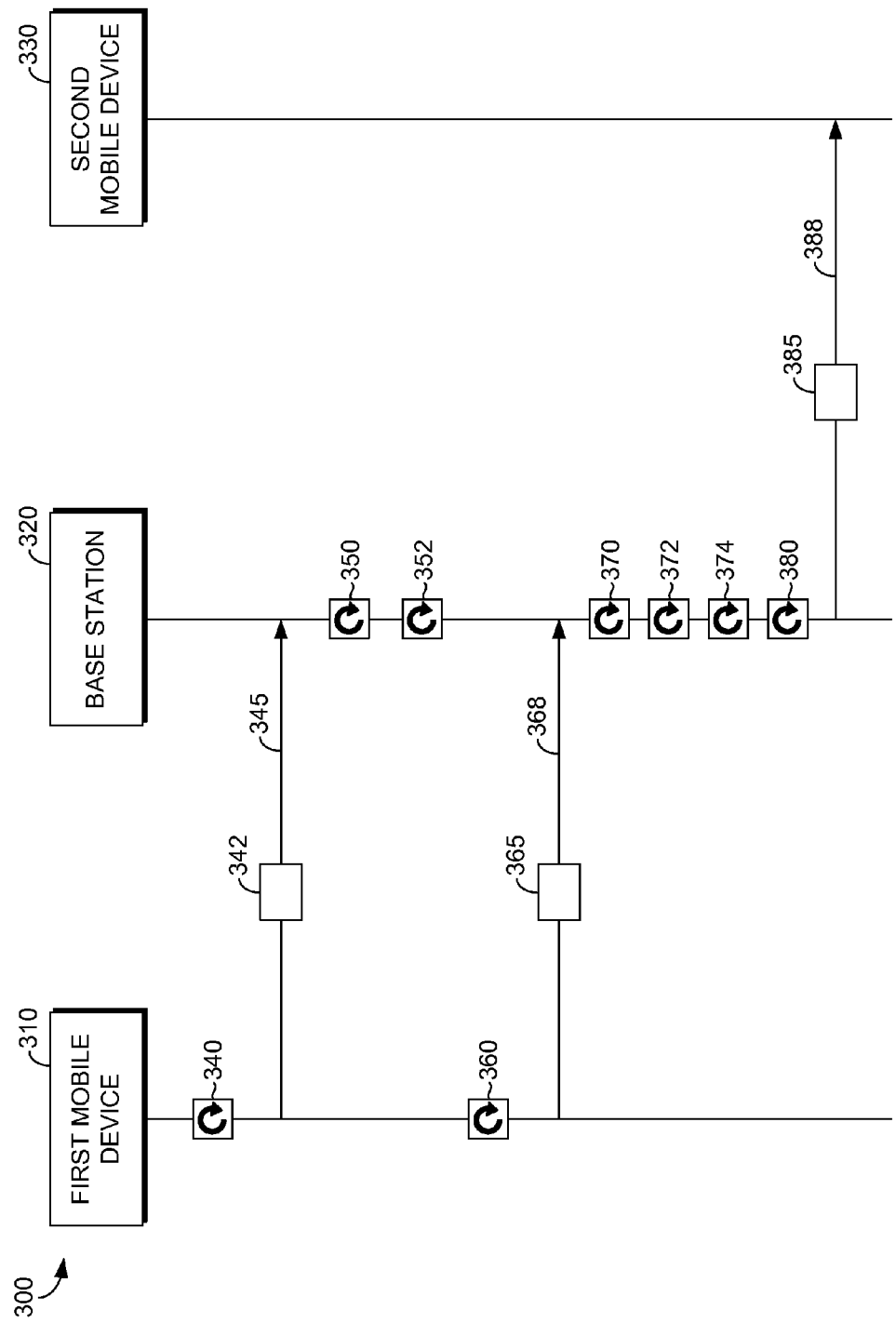
FIG. 3 depicts another illustrative flow diagram of a process for modifying frame error rates associated with a mobile device, in accordance with an embodiment of the present invention.

Further, a user may input a preference for a modified frame error rate while the mobile device is idle. In embodiments, a user may input a modified frame error rate that may be implemented during call set-up of a subsequent communication. In accordance with embodiments of the present invention, FIGS. 2 and 3 provide flow diagrams of modifying frame error rates. In particular, FIGS. 2 and 3 provide flow diagrams of modifying frame error rates during call set-up and during a call, respectively.

FIG. 2 depicts an illustrative flow diagram 200 of a process for modifying frame error rates associated with a mobile device, in accordance with an embodiment of the present invention. In particular, FIG. 2 provides flow diagram 200 of modifying frame error rates associated with first mobile device 210 during call set-up. Initially, base station 220 generates 240 a system parameters message 245. The system parameters message 245 includes a frame error rate associated with the network of base station 220. Base station 220 transmits 248 system parameters message 245 to first mobile device 210. After receiving 250 system parameters message 245, first mobile device 210 determines 252 that the frame error rate associated with the network does not match a desired frame error rate associated with first mobile device 210. In embodiments, determination 252 may be made during call set-up, during a call, or while first mobile device 210 is idle. Accordingly, first mobile device 210 generates 254 call set-up message 255.

Call set-up message 255 includes a modified frame error rate. In particular, call set-up message 255 comprises a modified frame error rate that matches the desired frame error rate associated with first mobile device 210. Alternatively, the modified frame error rate may be included in an extended channel assignment message that is sent from first mobile device 210 to base station 220. As discussed above, call set-up message 255 may contain the modified frame error rate within a reserved field in accordance with a wireless telecommunication standard, such as a CDMA standard. In particular, messages sent in accordance with wireless telecommunication standards have reserve fields that may be used to convey additional information used in the processing of the message. Alternatively, call set-up message 255 may contain information within the message that indicates a request for modifying the frame error rate. For instance, by addressing call set-up message 255 to an unused sector of the network, call set-up message 255 may indicate to base station 220 that call set-up message 255 includes a request to modify the frame error rate associated with first mobile device 210. First mobile device 210 then transmits 258 call set-up message 255 to base station 220.

Base station 220 receives 260 call set-up message 255. Further, base station 220 modifies 262 a frame error rate associated with first mobile device 210. For example, if an initial frame error rate associated with the network is 2% and first mobile device 210 requested base station 220 to modify the initial frame error rate to 1%, base station 220 would modify a frame error rate associated with first mobile device 210 by decreasing the frame error rate associated with first mobile device 210 by an amount of 1%.

Further, first mobile device 210 generates 270 call information 275. Using the example above where first mobile device 210 has a modified frame error rate of 1%, call information 275 contains frames with errors of 1.5%. First mobile device 210 transmits 278 call information 275 to base station 220. Base station 220 receives 280 call information 275. Further, base station 220 analyzes 282 call information 275 to determine 284 a frame error rate associated with call information 275. In embodiments, base station 220 may analyze 282 call information 275 by running a cyclic redundancy check on call information 275. After analyzing 282 call information 275, base station 220 determines 284 call information 275 has a frame error rate of 1.5%. Under its standard frame error rate threshold of 2%, base station 220 would simply forward the uncorrupted call information to second mobile device 230.

However, under the modified frame error rate of 1%, base station 220 takes two actions: 1) base station 220 generates 290 modified call information 295, where modified call information 295 contains the uncorrupted 98.5% of call information 275, and transmits 298 modified call information 295 to second mobile device 230; and 2) base station 220 generates 292 power request 294 and transmits 296 power request 294 to first mobile device 210. Power request 294 includes a request for first mobile device 210 to increase power between first mobile device 210 and base station 220. Base station 220 will continue to generate a power request 294 in response to first mobile device 210 transmitting call information to base station that fails to meet the modified frame error rate of 1% associated with first mobile device 210. In alternative embodiments, first mobile device 210 may receive call set-up messages from a network component, such as base station 220. In response, first mobile device 210 may generate responsive call set-up messages comprising a modified frame error rate.

FIG. 3 depicts another illustrative flow diagram 300 of a process for modifying frame error rates associated with a mobile device, in accordance with an embodiment of the present invention. In particular, FIG. 3 provides flow diagram 300 of modifying frame error rates associated with first mobile device 310 during a call. Initially, as shown at block 340, first mobile device 310 generates a request 342. Request 342 includes information requesting that the frame error rate associated with first mobile device 310 be modified. As such, request 342 includes a modified frame error rate. Further, request 342 is sent 345 to base station 320.

In embodiments, a user associated with a mobile device, such as first mobile device 310, may request a modification of a frame error rate associated with the mobile device so as to maximize call quality and/or battery life, as discussed above. Alternatively, first mobile device 310 may include a program that automatically modifies the frame error rate associated with first mobile device 310 to be consistent with user behavior. For instance, if a user associated with first mobile device 310 habitually requests a change in frame error rate on the weekends to maximize battery life, and conversely habitually requests a change in frame error rate during weekday working hours to maximize call quality, such standards may be programmed and/or learned by a program on first mobile device 310. As such, request 342 may be generated based on a user request and/or may be generated based on a separate program, such as a program based on user behavior.

Once request 342 is received 350 at base station 320, base station 320 modifies 352 a frame error rate associated with first mobile device 310. For example, if an initial frame error rate associated with the network is 2% and first mobile device 310 requested base station 320 to modify the initial frame error rate to 3%, base station 320 would modify a frame error rate associated with first mobile device 310 by increasing the frame error rate associated with first mobile device 310 by an amount of 1%. By increasing the frame error rate associated with first mobile device 310, first mobile device 310 is allowed to decrease power between first mobile device 310 and base station 320. Further, decreasing power between first mobile device 310 and base 320 increases battery life of first mobile device 310.

Further, first mobile device 310 generates 360 call information 365. Using the example above where first mobile device 310 has a modified frame error rate of 3%, call information 365 contains frames with errors of 2.5%. First mobile device 310 transmits 368 call information 365 to base station 320. Base station 320 receives 370 call information 365. Further, base station 320 analyzes 372 call information 365 to determine 374 a frame error rate associated with call information 365. In embodiments, base station 320 may analyze 372 call information 365 by running a cyclic redundancy check on call information 365. After analyzing 372 call information 365, base station 320 determines 374 call information 365 has a frame error rate of 2.5%. Under its standard frame error rate threshold of 2%, base station 320 would request that first mobile device 310 increase power between first mobile device 310 and base station 320 to lower frame error rate and improve call quality. Such an action would likely increase the rate of battery drain of first mobile device 310. However, under the modified frame error rate of 3%, base station 320 simply forwards the uncorrupted call information to second mobile device 330. Further, base station 320 generates 380 modified call information 385, where modified call information 385 contains the uncorrupted 97.5% of call information 365, and transmits 388 modified call information 385 to second mobile device 330.

FIG. 4 is a flow diagram 400 showing an embodiment of a method of modifying frame error rates associated with a mobile device, in accordance with an embodiment of the present invention. At block 410, a system parameters message (245) is received. The system parameters message (245) may include an initial frame error rate associated with a network. When a mobile device (210) engages with the network, the system parameters message (245) may be used to assign the mobile device (210) with the initial frame error rate. In embodiments, the system parameters message (245) may originate from a base station (220). At block 420, a determination is made that the initial frame error rate does not match a desired frame error rate. The desired frame error rate may be associated with the mobile device (210). In embodiments, a desired frame error rate may be input by a user associated with the mobile device. Alternatively, the desired frame error rate may be specific to a particular device used to initiate communication over the network. For instance, a mobile phone manufacturer may have a financial interest in maximizing call quality. As such, the mobile phone manufacturer may install software on the mobile phones it produces to establish a threshold frame error rate that must be met for calls to be initiated. At block 430, a message (255) including a modified frame error rate is transmitted (258). The message (255) may be generated (254) at the mobile device (210). Further, the modified frame error rate may be based on the desired frame error rate. In particular, the modified frame error rate may match the desired frame error rate. At block 440, the initial frame error rate is modified (262). In particular, the initial frame error rate may be modified (262) based on the modified frame error rate.

FIG. 5 is a flow diagram 500 showing another embodiment of a method of modifying frame error rates associated with a mobile device (110), in accordance with an embodiment of the present invention. At block 510, it is determined that a frame error rate associated with a network does not match a desired frame error rate. The desired frame error rate may be associated with a mobile device (110). In particular, the desired frame error rate may be input by a user associated with the mobile device (110). Alternatively, the desired frame error rate may be determined by a program with access to the mobile device (110). In embodiments, the program may determine the desired frame error rate based on user behavior of one or more users associated with the mobile device (110). At block 520, call set-up messages may be received at the mobile device (110). Further, the call set-up messages may originate from a cell node (120). The call set-up messages may be initiated by the cell node (120). Alternatively, the call set-up messages may be part of a call set-up process that was initially started by the mobile device (110). At block 530, a responsive call set-up message is generated. In particular, a responsive call set-up message may be initiated by the mobile device (110). Further, the responsive call set-up message may include a modified frame error rate. The modified error rate may be between the frame error rate associated with the network and the desired frame error rate. As discussed above, the modified frame error rate may be stored in a reserved field of a message. At block 540, the responsive call set-up message is transmitted. In particular, the responsive call set-up message may be transmitted to a cell node (120). At block 550, the frame error rate is modified at the cell node (120). The frame error rate may be modified based on the modified frame error rate contained in the responsive all set-up message. In particular, the frame error rate may be modified to approach the value of the modified frame error rate. Alternatively, the frame error rate may be modified to match the modified frame error rate.

Figure 6:
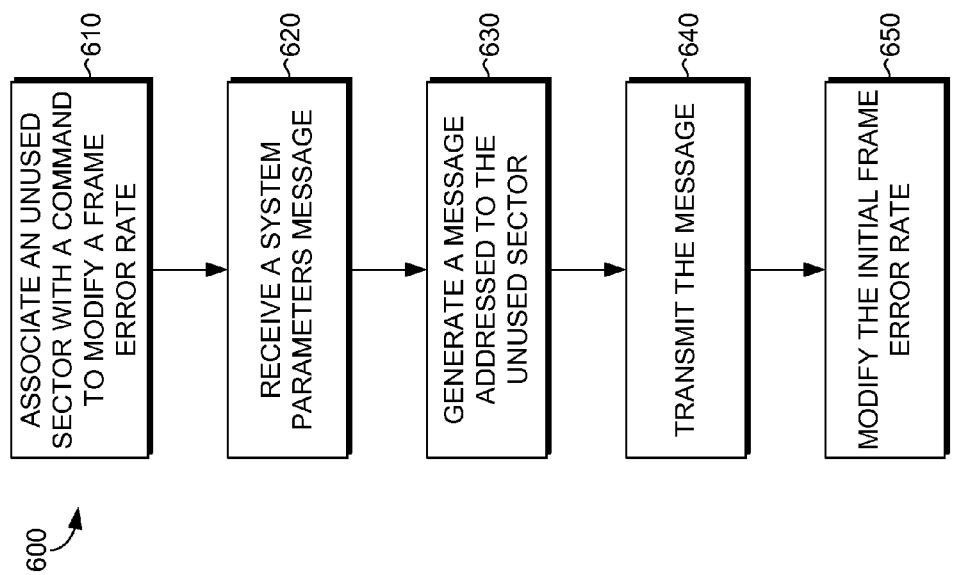
FIG. 6 is a flow diagram showing a further embodiment of a method of modifying frame error rates associated with a mobile device, in accordance with an embodiment of the present invention.

FIG. 6 is a flow diagram 600 showing a further embodiment of a method of modifying frame error rates associated with a mobile device (210), in accordance with an embodiment of the present invention. At block 610, a command to modify a frame error rate is associated with an unused sector. At block 620, a system parameters message (245) is received at a mobile device (210). The system parameters message (245) may originate from a base station (220). Further, the system parameters message (245) may include a frame error rate. In particular, the system parameters message may include a frame error rate associated with a network. A mobile device (210) assigned to the network may receive the system parameters message (245) to be informed of the frame error rate associated with that network. At block 630, it is determined that the frame error rate does not match a desired frame error rate. A message addressed to the unused sector is generated at the mobile device. A desired frame error rate may be associated with the mobile device (210). Further, the desired frame error rate may be assigned by a user of the mobile device (210). Alternatively, the desired frame error rate may be configured based on the mobile phone usage habits of a user. For instance, a desired frame error rate may be higher during normal business hours, when a user is more likely to be doing business, e.g., when the work of a user depends upon a high level of voice call quality. As such, the desired frame error rate may be lowered during the evening when a user may be more likely to engage in social calls that may not require such a high frame error rate.

At block 640, a message (255) is transmitted from the mobile device (210). The message (255) may include a modified frame error rate. In particular, the message (255) may include a frame error rate that is modified in response to the receipt of the system parameters message (255). The message (255) may be transmitted to a base station (220). Further, at block 650, the frame error rate is modified (262) at the base station (220).

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A non-transitory computer-readable storage media having computer-executable instructions embodied thereon that, when executed by a computing device, cause one or more mobile devices to perform a method of modifying frame error rates associated with a mobile device, the method comprising:
   receiving, at the mobile device, a system parameters message originating from a base station of a network, the system parameters message indicating an initial assigned frame error rate configuration parameter associated with the network;
   determining the initial assigned frame error rate configuration parameter associated with the network does not match a desired frame error rate configuration parameter associated with the mobile device;
   transmitting, by a user from the mobile device, a message indicating a modified frame error rate configuration parameter associated with the mobile device in response to receiving the system parameters message, wherein the modified frame error rate configuration parameter associated with the mobile device matches the desired frame error rate configuration parameter associated with the mobile device; and
   modifying the initial assigned frame error rate configuration parameter associated with the network at the cell node.

2. The non-transitory computer-readable storage media of claim 1, wherein the initial assigned frame error rate configuration parameter at the cell node is modified to approach the modified frame error rate configuration parameter associated with the mobile device.

3. The non-transitory computer-readable storage media of claim 2, wherein the initial assigned frame error rate configuration parameter at the cell node is modified to match the modified frame error rate configuration parameter associated with the mobile device.

4. The non-transitory computer-readable storage media of claim 1, wherein the modified frame error rate configuration parameter associated with the mobile device is determined based on user behavior.

5. A non-transitory computer-readable storage media having computer-executable instructions embodied thereon that, when executed by a computing device, cause one or more mobile devices to perform a method of modifying frame error rates associated with a mobile device, the method comprising:
   determining an assigned frame error rate configuration parameter associated with a network does not match a desired frame error rate configuration parameter associated with the mobile device;
   receiving, at the mobile device, call set-up messages originating from a cell node;
   generating, at the mobile device, a responsive call set-up message comprising a modified frame error rate configuration parameter within a reserved field, wherein the modified frame error rate configuration parameter is between the assigned frame error rate configuration parameter associated with the network and the desired frame error rate configuration parameter;
   transmitting, by a user from the mobile device, the responsive call set-up message to the cell node; and
   modifying the assigned frame error rate configuration parameter at the cell node to be the modified frame error rate configuration parameter associated with the mobile device in response to receiving the responsive call set-up message.

6. The non-transitory computer-readable storage media of claim 5, wherein the assigned frame error rate configuration parameter is modified to match the desired frame error rate configuration parameter.

7. The non-transitory computer-readable storage media of claim 5, further comprising:
   storing, at the cell node, the modified frame error rate configuration parameter associated with the mobile device.

8. A non-transitory computer-readable storage media having computer-executable instructions embodied thereon that, when executed by a computing device, cause one or more mobile devices to perform a method of modifying frame error rates associated with a mobile device, the method comprising:
   associating an unused sector with a command to modify a frame error rate configuration parameter;
   receiving, at the mobile device, a system parameters message originating from a cell node of a network, the system parameters message comprising an initial assigned frame error rate configuration parameter associated with the network;
   determining the initial assigned frame error rate configuration parameter associated with the network does not match a desired frame error rate configuration parameter associated with the mobile device;
   generating, at the mobile device, a message addressed to the unused sector;
   transmitting, by a user from the mobile device, the message to the cell node; and
   modifying the initial assigned frame error rate configuration parameter at the cell node based upon the desired frame error rate configuration parameter in response to receiving the message addressed to the unused sector.

9. The non-transitory computer-readable storage media of claim 8, wherein the message to the unused sector is addressed based on a degree of modification required to adjust the initial assigned frame error rate configuration parameter to match the desired frame error rate configuration parameter.

10. The non-transitory computer-readable storage media of claim 8, wherein the unused sector is associated with a command to add an offset of a pre-determined amount to the initial assigned frame error rate configuration parameter associated with the network.

11. The non-transitory computer-readable storage media of claim 8, wherein the unused sector is associated with a command to subtract an offset of a pre-determined amount to the initial assigned frame error rate configuration parameter associated with the network.

12. The non-transitory computer-readable storage media of claim 8, wherein the unused sector is associated with a command to reset the initial assigned frame error rate configuration parameter to match the desired frame error rate configuration parameter associated with the mobile device.

13. The non-transitory computer-readable storage media of claim 8, wherein the initial assigned frame error rate configuration parameter is modified based on the command associated with the unused sector.

\* \* \* \* \*